Nov. 11, 1947.       E. ACHESON       2,430,442
VEHICLE TOP
Filed June 14, 1944       3 Sheets-Sheet 2

INVENTOR.
ERNEST ACHESON
BY
ATTORNEYS

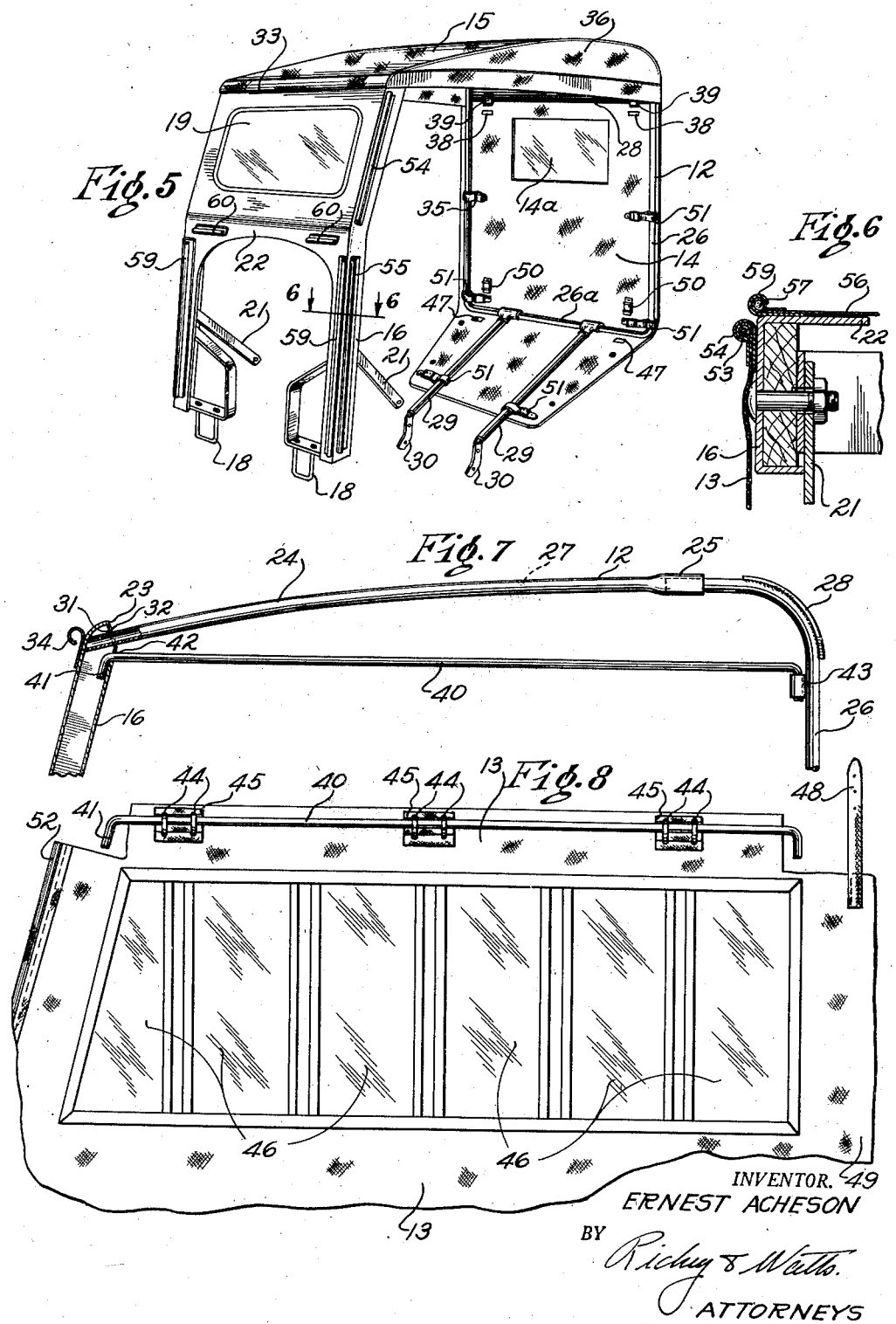

Patented Nov. 11, 1947

2,430,442

UNITED STATES PATENT OFFICE 2,430,442

VEHICLE TOP

Ernest Acheson, Cleveland, Ohio

Application June 14, 1944, Serial No. 540,303

11 Claims. (Cl. 296—102)

This invention relates broadly to demountable tops for motor propelled vehicles, and, more specifically, to an improved frame and curtain construction for vehicles, such as tractors, agricultural implements and similar machines normally used in fair weather or under seasonable climatic conditions.

One of the objects of the invention is to provide a novel top construction that may be readily mounted upon a vehicle of the class described to protect the operator from the inclemency of the weather.

Another object of the invention is to provide a top embodying a plurality of readily adjustable curtains which are designed for adjustment to form a complete enclosure, a partial enclosure or merely a canopy, depending upon the degree of protection desired by the operator.

Another object of the invention is to provide a top which will afford full freedom of movement and vision for the operator regardless of whether or not the elements forming the top are adjusted in their fully closed position.

A further object is to provide removable side curtains for the top construction, which may be adjusted to form full side wall enclosures or drawn back upon themselves to form side door openings.

Another object is to provide a rear curtain which may be rolled up to the canopy portion of the top to completely expose the rear section of the enclosure.

Another object of the invention is to provide a top frame that may be readily removed from the vehicle by merely releasing the forward end of the frame, then lifting the structure from sockets provided for the support of the rearward portion thereof.

Further objects of the invention reside in the provision of a sturdily constructed, durable, inexpensive, light weight, adjustable top enclosure for vehicles of the class described.

Other objects and advantages more or less ancillary to the foregoing, and the manner in which all of the various objects are realized will be made apparent by the following description which, considered in connection with the accompanying drawings, sets forth the preferred embodiment of the invention.

Referring to the drawings:

Fig. 5 is a perspective view of the frame, canopy and rear curtain;

Fig. 6 is a transverse sectional view through a forward corner of the curtain structure, the location of the section being indicated by the line 6—6 in Fig. 5;

Fig. 7 is a fragmentary side elevational view of the upper section of the frame; and Fig. 8 is a fragmentary elevational view of a side curtain and the supporting rod therefor.

Figure 1:
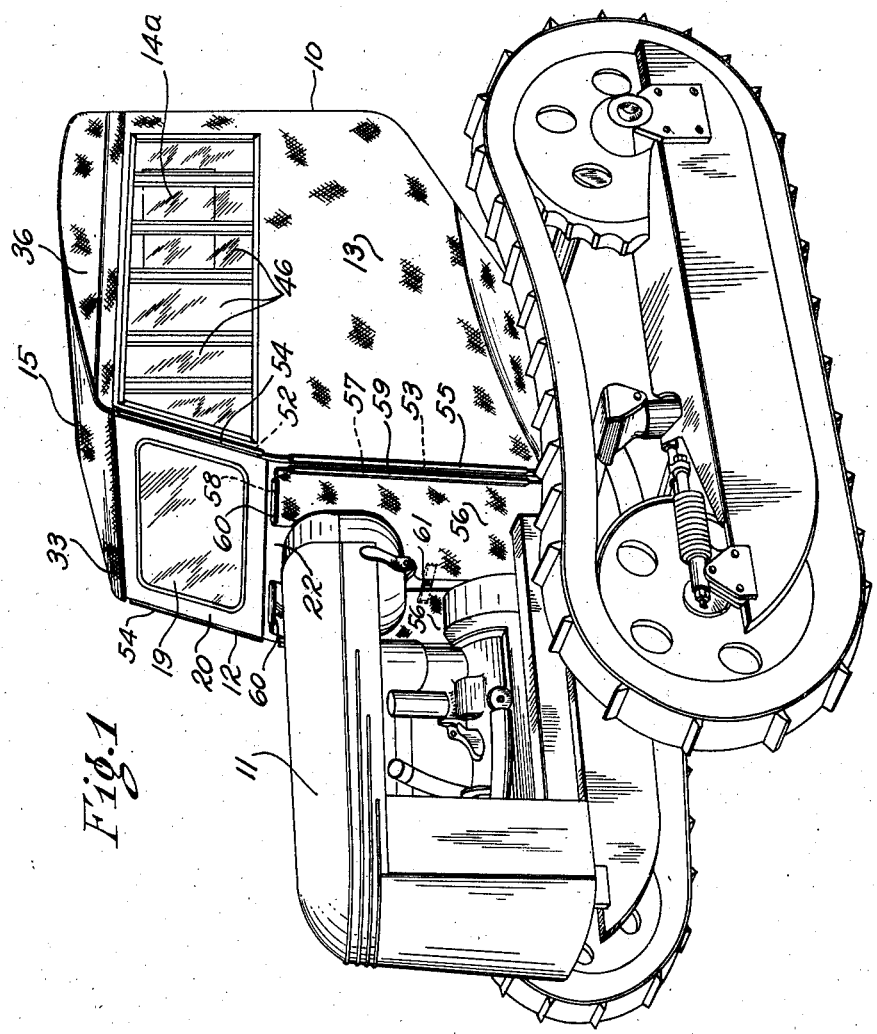
Fig. 1 is a perspective view of a tractor having one embodiment of the top construction arranged in its assembled position thereon; the curtain on the right side of the vehicle being removed in the interest of clarity.
Figures 2, 3, 4:
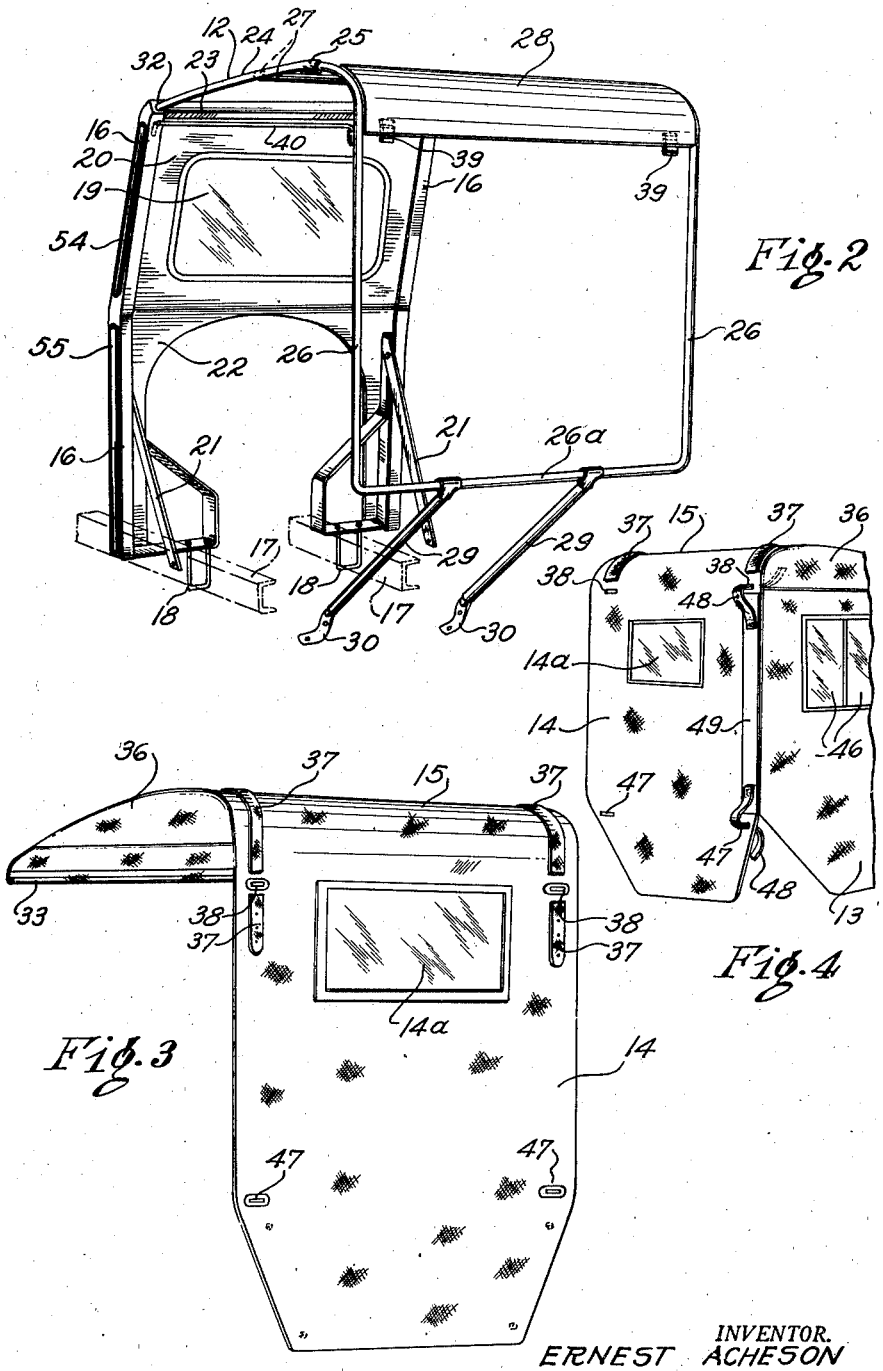
Fig. 2 is a view in perspective of the top frame, including all of the metal parts embodied therein.
Fig. 3 is a perspective view of the canopy and rear curtain.
Fig. 4 is a perspective of a fragmentary portion of the top as viewed from the rear right corner of the vehicle.

Referring to Fig. 1 of the drawings the improved top indicated generally by the numeral 10, is shown in its closed position upon a tractor 11. The top 10 includes a frame 12, side curtains 13, a rear curtain 14, and a canopy 15. The frame 12 (Fig. 2) includes front corner stanchions 16 mounted on the vehicular frame 17 of the tractor 11 by U-bolts 18 and is adapted to support a windshield 19 disposed within a metal frame or panel 20. Bars 21 constituting braces for the windshield are secured to the stanchions 16, the free ends thereof being drilled for assembly with the frame 17 by bolts provided in the chassis for other purposes. A plate 22 configured to fit snugly over the upper surface of the tractor hood is disposed between the stanchions 16 and below the windshield 19. The upper ends of the stanchions are supported by a cross member 23 forming the top rail of the windshield frame work and constituting the supporting medium for the forward end of the top.

The frame, as shown, is constructed from tubing, the top sections 24 thereof being preferably bowed and formed with sockets 25 therein for the reception of the end portions of the vertical members 26 that form the rear stanchions for the top. The sections 24 are united by cross member 27 (Figs. 2 and 7) disposed adjacent the sockets 25 and in the horizontal plane thereof. The vertical members are bent to form a transverse section 26—a and are connected adjacent their opposed ends by an arcuate plate 28 which constitutes the corner support for the canopy 15. The forward edge of the plate 28 is disposed adjacent the ends of the vertical members that are engaged with the sockets 25, the contour of the plate being designed to eliminate excessive wear of the canvas canopy and also enhance the general appearance of the vehicle top. The transverse section 26—a is provided with a pair of depending arms 29 which are inclined forwardly and adapted for telescopic engagement in brackets 30 formed with arcuate ends having apertures therein for securement upon the bolts in the differential gear housing members of the rear axle assembly.

The forward ends of the frame top sections 24 are supported in apertures 31 formed in the rearward wall 32 of the stanchion 16. The wall 32 is suitably spaced relative to the forward face of the post or stanchion 16 to afford a liberal bearing for the ends of the top sections and also accommodate the ready attachment or removal of the sections.

For convenience of assembly the canopy 15 and the rear curtain 14 may be formed of a single strip of canvas having a bolt rope 33 retained within a pocket formed in the hemmed forward edge thereof. The canopy 15 is secured in place by threading the bolt rope 33 through a split tubular rail 34 mounted on the forward face of the cross member 23, then folding the body of the canvas that protrudes through the slot back over the upper face of the rail. The canvas is tailored to fit snugly over the top and sides of the sections 24, over the cross member 27, the arcuate plate 28, the transverse section 26—a, the vertical members 26 and the arms 29. A canvas valence 36 is sewed to the marginal edges of the material forming the canopy 15 to complete the enclosure of the top or canopy section. Straps 37 sewed upon the outer face of the canopy 15 are provided for the support of the rear curtain 14 in its rolled or elevated position. When the curtain is rolled down the free ends of the straps 37 may be tucked through openings 38 in the upper corners thereof. The curtain is retained in its rolled position by the looped engagement of the straps 37 with the body thereof and the securement of the straps within brackets 39 mounted in and depending from the lower edges of the plate 28. A window 14—a of Celluloid or other suitable material, is provided in the rear curtain 14 to afford vision for operational manipulations of the vehicle when driven in reverse gear.

The frame assembly includes a pair of readily removable tie rods 40 which are designed for the dual purpose of supporting the side curtains 13 and locking the frame members 26 against longitudinal movement relative to the front stanchion 16. As will be seen in Fig. 7 the rods 40 are formed with depending end portions 41 adapted for engagement within openings 42 in the rear walls of the stanchions 16 and within openings in brackets 43 secured to the vertical members 26 adjacent the upper ends thereof. The rods are threaded through oval rings 44 arranged in pairs and supported by fabric strips 45 sewed to the upper edge of the curtains 13. A plurality of parallel, relatively narrow windows 46 formed of Celluloid or other suitable material are provided in the central portions of the side curtains 13. The rings 44 are preferably disposed to facilitate the arrangement of the curtains in pleated form when retracted for ventilation or for the purpose of entry into the vehicle.

The rear curtain is provided with elongated grommets 38 and 47 for the reception of straps 48 sewed to flaps 49 formed in the rear marginal edges of the side curtains 13. Upon assembly the straps 48 are engaged with buckles 50 sewed to the inner face of the rear curtain 14. The back drop or rear curtain is further provided with straps and buckles 51 adapted for engagement with the vertical rear stanchions 26 and the arms 29. The forward ends of the side curtains are edged with bolt ropes 52 and 53 adapted for engagement in open circular channels 54 and 55 mounted on the outer face of the front stanchion 16. As will be seen in Fig. 1, the top assembly includes a pair of front curtains 56, cut and finished to fit snugly about the tractor hood, the frame and the engine transmission case. The top and sides of the curtains 56 are formed with bolt ropes 57 and 58 adapted for engagement in channels 59 and 60 mounted respectively on the forward face of the stanchions 16 and the plate 22. The central portions of the front curtains may be drawn together and the assembly held taut by a strap and buckle 61 attached to the curtain at a point or points which will effectuate a uniform tension upon the fabric.

From the foregoing it will be seen that the improved top frame structure may be readily attached to the vehicle without drilling any new holes therein, that the canvas top and curtain members may be quickly mounted thereon or removed therefrom that the frame when dismantled may be stored in a relatively narrow space and that the top when fully assembled will form a tight weather proof enclosure without undue sacrifice to visibility or freedom of movement of the operator.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination with a tractor embodying chassis side rails and a rear axle, a top frame for said tractor comprising a pair of stanchions clamped upon the side rails of the tractor, said stanchions being formed of tubular stock and having openings in the upper ends thereof, a windshield mounted on said stanchions, tubular top frame sections freely engaged with the uppermost apertures in said stanchions, rear frame sections freely engaged in telescopic relation with said top sections and depending therefrom, an arcuate plate connecting the right and left rear frame sections with each other adjacent the connection between the top and rear sections, a transverse section uniting the lower ends of the right and left rear frame sections, arms on said transverse section clamped upon the tractor rear axle, brackets having openings therein affixed upon said rear frame sections adjacent the upper ends thereof and rods formed with depending ends hooked into the lower apertures in the stanchions and the openings in said brackets, said rods constituting tie bars for the retention of the connection between the top and rear sections.

2. In combination with a tractor embodying chassis side rails and a rear axle, a top for said tractor comprising a pair of stanchions clamped upon the side rails of the tractor, said stanchions having a plurality of apertures in the upper ends thereof disposed in spaced relation with each other, a windshield mounted on said stanchions, top frame sections loosely seated in certain of said apertures in said stanchions, said sections having sockets in the rear ends thereof, rear frame sections disposed substantially normal to said top sections, the end portions of said rear sections being loosely seated in said sockets, a plate uniting the right and left rear sections adjacent the upper ends of the rear sections, a tie bar uniting the right and left rear sections at the lower ends of the rear sections, arms thereon clamped to the tractor rear axle, a canvas strip constituting a canopy and rear curtain secured to said windshield and rear frame tie bar and supported by said top sections, said plate and said rear frame sections, brackets having openings thereon affixed upon the rear frame sections adjacent the upper ends thereof, rods formed with depending ends loosely seated in certain other apertures in said stanchions and in the openings in said brackets, and side curtains suspended from said rods.

3. In combination with a tractor embodying chassis side rails and a rear axle, a top for said tractor comprising a pair of stanchions clamped to the side rails of the tractor, a windshield mounted on said stanchions, top frame sections mounted on the upper ends of said stanchions for sliding movement relative thereto in a horizontal plane, rear frame sections depending from said top sections and engaged therewith for sliding movement in a horizontal plane, frame cross members uniting the rear frame sections, arms mounted on the tractor rear axle and one of said frame cross members for the support thereof, a canopy and rear drop curtain supported by said windshield, said frame and said cross members, a pair of tie rods, hooks on the ends thereof engaged with said stanchions and said rear frame sections for sliding movement in a vertical plane, side curtains mounted on said tie rods and means on said stanchions enveloping the forward edge of said curtains for the securement thereof.

4. In combination with a tractor embodying chassis side rails and a rear axle, a top for said tractor comprising a pair of stanchions having apertures in the upper ends thereof clamped to said side rails, tubular horizontal top sections slidably engaged with certain of said apertures in the stanchions, vertical rear sections, bent end portions thereon slidably engaged with the tubular top sections, arms coupled with the rear axle and the rear sections, a canopy supported by a cross piece mounted on said stanchions and by said top sections, rods intermeshed with said stanchions and said rear sections, means on said rods to restrain the sliding movement of said top sections relative to the stanchions and bent end portions of the rear frame sections, side curtains suspended from said rods, tubular rails having slots throughout the length thereof mounted on said stanchions and bolt ropes in the forward edge of said side curtains engaged in said tubular rails.

5. In combination with a tractor embodying a rear axle and chassis side rails, a top for said tractor comprising stanchions clamped to the chassis side rails, a windshield mounted on said stanchions, a rear frame section demountably attached to the tractor rear axle, a top frame section slidably engaged with said stanchions and said rear frame section, rods slidably engaged with said stanchions and said rear frame sections, means thereon to delimit the sliding movement of said top frame sections, a split tubular rail mounted on the top of said windshield, a canopy having a bolt rope in the forward edge thereof engaged within said split rail and supported by said top frame sections, split tubular rails mounted on said stanchions, side curtains supported by said rods, and bolt ropes in the forward edge of said side curtains engaged within the split tubular rails on said stanchions.

6. In combination with a tractor embodying a chassis and rear axle, a demountable top therefor comprising stanchions clamped upon said chassis, rails thereon each having a lineal groove therein a windshield mounted on said stanchions, a rail thereon having a lineal groove therein, a rear frame section bolted to said axle, a top frame section slidably engaged with said stanchions and said rear frame sections, tie rods to restrain the sliding movement of said top sections slidably engaged with said stanchions and said rear frame section, a canopy slidably engaged within the groove in the rail on said windshield and supported on said top sections, and side curtains slidably engaged within the grooves in the rails on said stanchions and supported by said tie rods.

7. In combination with a tractor embodying a rear axle and a chassis, a top frame for said tractor comprising stanchions clamped on said chassis, rear frame sections clamped on said axle, top frame sections loosely seated in telescopic engagement with said stanchions and rear frame sections, and tie rods to maintain the top frame sections seated, the forward end of each tie rod being loosely seated in telescopic engagement with one of said stanchions and the rear end of each tie rod being loosely seated in telescopic engagement with one of said rear frame sections, the axis of telescopic engagement of the rod with the stanchions and rear frame sections being disposed at right angles to the axis of telescopic engagement of the top sections with the stanchions and rear frame sections.

8. In combination with a tractor embodying chassis side rails and a rear axle, a top frame for said tractor comprising a pair of stanchions clamped upon the side rails of the tractor, said stanchions being formed of tubular stock and having openings in the upper ends thereof, tubular top frame sections freely engaged with the uppermost apertures in said stanchions, rear frame sections freely engaged in telescopic relation with said top sections and depending therefrom, an arcuate plate connecting the right and left rear frame sections with each other adjacent the connection between the top and rear sections, a transverse section uniting the lower ends of the right and left rear frame sections, arms on said transverse section clamped upon the tractor rear axle, brackets having openings therein affixed upon said rear frame sections adjacent the upper ends thereof and rods formed with depending ends hooked into the lower apertures in the stanchions and the openings in said brackets, said rods constituting tie bars for the retention of the connection between the top and rear sections.

9. In combination with a tractor embodying chassis side rails and a rear axle, a top for said tractor comprising a pair of stanchions clamped upon the side rails of the tractor, said stanchions having a plurality of apertures in the upper ends thereof disposed in spaced relation with each other, a cross piece mounted on said stanchions, top frame sections loosely seated in certain of said apertures in said stanchions, said sections having sockets in the rear ends thereof, rear frame sections disposed substantially normal to said top sections, the end portions of said rear sections being loosely seated in said sockets, a plate uniting the right and left rear sections adjacent the upper ends of the rear sections, a tie bar uniting the right and left rear sections at the lower ends of the rear sections, arms thereon clamped to the tractor rear axle, a canvas strip constituting a canopy and rear curtain secured to said cross piece and rear frame tie bar and supported by said top sections, said plate and said rear frame sections, brackets having openings thereon affixed upon the rear frame sections adjacent the upper ends thereof, rods formed with depending ends loosely seated in certain other apertures in said stanchions and in the openings in said brackets, and side curtains suspended from said rods.

10. In combination with a tractor embodying chassis side rails and a rear axle, a top for said tractor comprising a pair of stanchions clamped to the side rails of the tractor, a cross piece mounted on said stanchions, top frame sections mounted on the upper ends of said stanchions for sliding movement relative thereto in a horizontal plane, rear frame sections depending from said top sections and engaged therewith for sliding movement in a horizontal plane, frame cross members uniting the rear frame sections, arms mounted on the tractor rear axle and one of said frame cross members for the support thereof, a canopy and rear drop curtain supported by said cross piece, said frame and said cross members, a pair of tie rods, hooks on the ends thereof engaged with said stanchions and said rear frame sections for sliding movement in a vertical plane, side curtains mounted on said tie rods and means on said stanchions enveloping the forward edge of said curtains for the securement thereof.

11. In combination with a tractor embodying a rear axle and chassis side rails, a top for said tractor comprising stanchions clamped to the chassis side rails, a rear frame section demountably attached to the tractor rear axle, a top frame section, slidably engaged with said stanchions and said rear frame section, rods slidably engaged with said stanchions and said rear frame sections, means thereon to delimit the sliding movement of said top frame sections, a split tubular rail mounted on the top of said stanchions, a canopy having a bolt rope in the forward edge thereof engaged within said split rail and supported by said top frame sections, split tubular rails mounted on said stanchions, side curtains supported by said rods, and bolt ropes in the forward edge of said side curtains engaged within the split tubular rails on said stanchions.

ERNEST ACHESON.

REFERENCES CITED

The following references are of record in the file of this patent:

UNITED STATES PATENTS

| Number | Name | Date |
|---|---|---|
| 1,922,545 | Locke et al. | Aug. 15, 1933 |
| 1,970,887 | Elias | Aug. 21, 1934 |
| 2,267,227 | Williams | Dec. 23, 1941 |
| 1,384,735 | Anderson | July 19, 1921 |
| 1,469,713 | Blackinton et al. | Oct. 2, 1923 |
| 1,291,342 | Young | Jan. 14, 1919 |
| 1,197,294 | Ilse | Sept. 5, 1916 |
| 1,679,642 | Walden | Aug. 7, 1928 |

FOREIGN PATENTS

| Number | Country | Date |
|---|---|---|
| 509,764 | Great Britain | July 17, 1939 |